(12) United States Patent
Song et al.

(10) Patent No.: US 12,227,430 B2
(45) Date of Patent: Feb. 18, 2025

(54) COBALT OXIDE AS A PRECURSOR OF POSITIVE ELECTRODE MATERIALS FOR RECHARGEABLE LITHIUM ION BATTERIES

(71) Applicants: UMICORE, Brussels (BE); UMICORE KOREA LTD., Chungcheongnam-do (KR)

(72) Inventors: KyeongSe Song, Chungcheongnam-do (KR); AReum Park, Chungcheongnam-do (KR); HeeSuk Ku, Chungcheongnam-do (KR); JinWook Kim, Chungcheongnam-do (KR)

(73) Assignees: UMICORE, Brussels (BE); UMICORE KOREA LTD., Chungcheongnam-do (KR)

( * ) Notice: Subject to any disclaimer, the term of this patent is extended or adjusted under 35 U.S.C. 154(b) by 821 days.

(21) Appl. No.: 17/414,998

(22) PCT Filed: Dec. 10, 2019

(86) PCT No.: PCT/IB2019/060606
§ 371 (c)(1),
(2) Date: Jun. 17, 2021

(87) PCT Pub. No.: WO2020/128714
PCT Pub. Date: Jun. 25, 2020

(65) Prior Publication Data
US 2022/0069299 A1    Mar. 3, 2022

Related U.S. Application Data

(60) Provisional application No. 62/781,792, filed on Dec. 19, 2018.

(30) Foreign Application Priority Data

Dec. 19, 2018 (EP) ..................... 18213806

(51) Int. Cl.
*C01G 51/04* (2006.01)
*H01M 4/04* (2006.01)
*H01M 4/525* (2010.01)

(52) U.S. Cl.
CPC .......... *C01G 51/04* (2013.01); *H01M 4/0471* (2013.01); *H01M 4/525* (2013.01)

(58) Field of Classification Search
CPC .................................................. C01G 51/04
See application file for complete search history.

(56) References Cited

U.S. PATENT DOCUMENTS

| 9,972,843 B2 | 5/2018 | De Palma et al. |
| 2007/0099087 A1 | 5/2007 | Mihara et al. |

(Continued)

FOREIGN PATENT DOCUMENTS

| CN | 101154902 A | * 4/2008 |
| CN | 106082356 A | 11/2016 |

(Continued)

OTHER PUBLICATIONS

Hamam et al, Correlating the mechanical strength of positive electrode material particles to their capacity retention, Cell Reports Physical Science 3, 100714, Jan. 19, 2022 (Year: 2022).*

(Continued)

*Primary Examiner* — Amanda C. Walke
(74) *Attorney, Agent, or Firm* — NK Patent Law (57) ABSTRACT

A cobalt oxide precursor powder for use in preparing a positive electrode active material and methods of production thereof are described. The precursor powder comprises particles has a Fd-3m structure and a formula $Co_{1-y}A_yO_x$, wherein $1<x\leq4/3$, $0\leq y\leq0.05$, wherein A comprises at least (Continued)

one element from the group consisting of Ni, Mn, Al, Mg, Ti, and Zr. The particles have a D50≥15 μm and a compressive strength at least 100 MPa and at most 170 MPa.

5 Claims, 3 Drawing Sheets

(56) References Cited

U.S. PATENT DOCUMENTS

| | | | |
|---|---|---|---|
| 2012/0134914 A1 | 5/2012 | Paulsen et al. | |
| 2014/0124701 A1 | 5/2014 | Vanhatalo et al. | |
| 2015/0372301 A1 | 12/2015 | Kim et al. | |
| 2016/0322633 A1 | 11/2016 | Kim et al. | |
| 2017/0062807 A1 | 3/2017 | Vanhatalo et al. | |
| 2017/0222225 A1 | 8/2017 | Kang et al. | |
| 2017/0317342 A1 | 11/2017 | Kang et al. | |
| 2018/0083278 A1* | 3/2018 | Dai | H01M 4/1391 |
| 2020/0203726 A1 | 6/2020 | Park et al. | |

FOREIGN PATENT DOCUMENTS

| | | | |
|---|---|---|---|
| CN | 106797030 A | 5/2017 | |
| CN | 108212035 A | 6/2018 | |
| EP | 3203552 A1 | 8/2017 | |
| EP | 3203553 A1 | 8/2017 | |
| JP | 2004220897 A | 8/2004 | |
| JP | 2012072050 A | 4/2012 | |
| JP | 2014523383 A | 9/2014 | |
| JP | 2017531901 A | 10/2017 | |
| WO | WO-2012029729 A1 * | 3/2012 | ............ C01G 51/04 |
| WO | 2018052210 A1 | 3/2018 | |
| WO | 2018162165 A1 | 9/2018 | |

OTHER PUBLICATIONS

Godillot et al, "Original Conductive Nano-Co3O4 Investigated as Electrode Material for Hybrid Supercapacitors", Electrochemical and Solid-State Letters, 14 (10) A139-A142 (2011) (Year: 2011).*
Sahoo et al., "Co3O4 nanostructures: the effect of synthesis conditions on particles size, magnetism and transport properties", Journal of Materials Chemistry A, 2013, 1, 15022-15030 (Year: 2013).*
ISA/KR; International Search Report and Written Opinion for International Patent Application No. PCT/IB2019/060606, dated Apr. 9, 2020, 7 pages.
WIPO; International Preliminary Report on Patentability for International Patent Application No. PCT/IB2019/060606, dated Apr. 1, 2021, 3 pages.
Su, Dawei, et al., "Single Crystalline Co3O4 Nanocrystals Exposed with Different Crystal Planes for Li—O2 Batteries", Scientific Reports, Aug. 2014, vol. 4, Article No. 5767, 9 pages.

* cited by examiner

COBALT OXIDE AS A PRECURSOR OF POSITIVE ELECTRODE MATERIALS FOR RECHARGEABLE LITHIUM ION BATTERIES

CROSS-REFERENCE TO RELATED APPLICATIONS

This application is a U.S. National Stage application of International Patent Application No. PCT/IB2019/060606, filed on Dec. 10, 2019, which claims the benefit of European Patent Application No. 18213806.5, filed on Dec. 19, 2018, and the benefit of U.S. Provisional Application No. 62/781,792, filed on Dec. 19, 2018.

TECHNICAL FIELD AND BACKGROUND

A cobalt oxide precursor powder for positive electrode active materials in rechargeable layered lithium cobalt oxide-based batteries is described herein. The described cobalt oxide precursor powder comprises particles having a relatively high mechanical strength as well as a relatively large average particle size, which can advantageously result in high energy density and cyclic capability for a battery having a positive electrode active material prepared from the cobalt oxide precursor powder. The cobalt oxide precursor powder can be prepared by consecutive heating process steps under a first dry non-oxidizing atmosphere and a second dry oxidizing atmosphere.

Layered lithium cobalt oxide-based rechargeable batteries as a category of (rechargeable) lithium ion batteries (LIBs) are currently used for laptops, cell phones, cameras, and a variety of other portable electronic devices due to their high volumetric and gravimetric energy density and their long cycle life. In addition, the layered $LiCoO_2$ materials (doped or not—hereafter referred to as "LCO") are preferred as a positive electrode material for LIBs because of their high theoretical capacity and good thermal stability.

Furthermore, to meet the increasing demand for portable applications, batteries having higher energy densities are needed.

To produce the LCO, cobalt based precursors such as, for example, cobalt carbonate ($CoCO_3$), cobalt hydroxide ($Co(OH)_2$), cobalt oxyhydroxide (CoOOH), or cobalt oxide ($Co_3O_4$) are generally used. Cobalt carbonate ($CoCO_3$), cobalt hydroxide ($Co(OH)_2$), and cobalt oxyhydroxide (CoOOH) are collectively referred to herein as cobalt salts or cobalt salt precursors.

In the general production process, a cobalt precursor is mixed with a lithium source precursor, such as, for example, lithium carbonate ($Li_2CO_3$) or lithium hydroxide (LiOH), and one or more dopants such as Al, Mg, or Ti. The mixture is put on a ceramic sagger (or tray) and heated at a high temperature (for example, 1000° C.) for several hours to create a sintered agglomerated LCO compound. The sintered agglomerated LCO compound is milled using milling equipment to obtain the final LCO compound.

An important battery characteristic for portable applications is the energy density of the battery. The energy density determines the battery size to store electrical energy. There are two types of energy density: gravimetric energy density and volumetric energy density. The type of the positive electrode material in a battery determines the energy density in the battery. The volumetric energy density is particularly important in portable applications because of consumer demands for smaller electronic devices. Thus, it is advantageous for a battery for use in portable electronic devices to contain a positive electrode material that has higher volumetric powder density. It is possible to increase volumetric energy density by applying pressure to a positive electrode material. However, applying too much pressure to the positive electrode material can have a detrimental impact on the cycle life of the battery in which the material is placed. Thus, a viable alternative option for improving volumetric energy density is desirable.

The cobalt precursors described herein can address the abovementioned problems whereas the cobalt precursors known from the prior art, for instance from US2017/062807 (referred hereunder as "US'807"), US2016/322633 ("US'633"), US2012/134914 ("US'914"), US2007/099087 ("US'087"), WO2018/162165 ("WO'165"), and WO2018/052210 (WO'210). For example, a positive electrode material produced from the described cobalt precursor powder can have high volumetric density as well as better cycle life while being easily manufactured, meaning that the positive electrode material produced from the described cobalt precursor powder is obtainable under standard sintering conditions.

SUMMARY

The present invention concerns the following Embodiments:

Embodiment 1: In a first aspect of the invention, a cobalt oxide precursor powder for use in preparing a positive electrode active material comprises particles having a formula $Co_{1-y}A_yO_x$, wherein $1<x\leq4/3$, $0\leq y\leq00.05$, and A comprises at least one element from the group consisting of Ni, Mn, Al, Mg, Ti, and Zr. The particles have a D50≥15 μm and a compressive strength of at least 100 MPa and at most 170 MPa. In a feature of this aspect, 15 μm<D50<25 μm. The cobalt oxide precursor powder according to the Embodiment 1 has a particle composition having a Fd-3m crystal structure. Preferably, A comprises Mn.

More preferably, in this Embodiment 1, the cobalt oxide precursor powder has particles having a circularity superior or equal to 0.80 and inferior or equal to 1.00.

Embodiment 2 according to Embodiment 1: In an additional feature of the first aspect, a change in D10 of the particles after applying a pressure of 50 MPa thereto is less than 60%, preferably less than 30%, more than 10%, preferably more than 5%.

Embodiment 3 according to Embodiment 1 or 2: In another feature of the first aspect, a molar ratio Li/(Co+A) for particles in the powder varies by less than 5%.

Embodiment 4 according to any of the preceding Embodiments: In another feature of the first aspect, a molar ratio Li/(Co+A) for particles in the powder varies by less than 3%.

Embodiment 4 according to any of the preceding Embodiments: In a second aspect of the invention, a cathode active material powder is prepared from the cobalt oxide precursor powder of the first aspect. With regard to the second aspect, the cathode active material has a remaining capacity (QR %) after fifty cycles of at least 40%. In yet another feature of said second aspect, a change in D10 of the cathode material particles after applying a pressure of 207 MPa thereto is less than 30%. In an additional feature, the powder has a pressed density greater than 3.7 g/cm$^3$.

Embodiment 5: In a third aspect of the invention, a method for making the cobalt oxide precursor powder according to any of the preceding Embodiments related to the first aspect comprises the steps of: providing a composition comprising cobalt salt particles (like $Co(OH)_2$ or $CoCO_3$), said cobalt salt particles optionally comprising at least one element from the group consisting of Ni, Mn, Al, Mg, Ti, and Zr, heating said composition comprising cobalt salt particles at a temperature of about 300° C. to about 450° C. in a dry inert atmosphere, preferably in a dry nitrogen or nitrogen-based atmosphere, for about 2-5 hours to form a composition comprising intermediate cobalt precursor particles, and heating the composition comprising intermediate precursor particles at a temperature of about 300° C. to about 600° C. in a dry oxidizing atmosphere (like dry air) for about 2-5 hours to form the powder comprising cobalt oxide precursor particles.

Embodiment 6 according to Embodiment 5: In a feature of the third aspect, heating in a dry inert atmosphere (for example in a dry nitrogen or nitrogen-based atmosphere) and heating in a dry oxidizing atmosphere are performed at the same temperature. With regard to this feature, the temperature may be about 350° C. to about 450° C., about 400° C. to about 450° C., or about 400° C.

Embodiment 7 according to Embodiment 5 or 6: In another feature of the third aspect, heating in a dry inert atmosphere (for example in a dry nitrogen or nitrogen-based atmosphere) and heating in a dry oxidizing atmosphere are performed at a different temperature. In yet another feature of the third aspect, heating in a dry inert atmosphere (for example in a dry nitrogen or nitrogen-based atmosphere) and heating in a dry oxidizing atmosphere take place in the same furnace. Alternatively, heating in a dry inert atmosphere (for example in a dry nitrogen or nitrogen-based atmosphere) and heating in a dry oxidizing atmosphere may take place in a different furnace.

In an additional feature of this aspect, heating in a dry inert atmosphere (for example in a dry nitrogen or nitrogen-based atmosphere) is performed for about 2-4 hours, about 2.5-3.5 hours, or about 3 hours. In yet another feature, heating in a dry oxidizing atmosphere is performed for about 2-4 hours, about 2.5-3.5 hours, or about 3 hours. The dry oxidizing atmosphere may comprise air.

Embodiment 8: In a fifth aspect, the invention covers a method of making a lithium cobalt oxide based active material powder for a secondary battery comprising the steps of: providing the precursor powder according to any of the preceding Embodiments related to the first aspect, providing a Li-comprising precursor powder and mixing said Li-comprising precursor powder with said precursor powder, and sintering said mixture in an oxygen comprising atmosphere at a temperature of at least 900° C. and at most 1200° C., thereby obtaining said lithium cobalt oxide based active material powder. In a feature of this aspect, the sintering temperature is either of at least 1000° C. when y>0 or at most 950° C. when y=0.

In a feature of this aspect, the precursor powder according to any of the preceding Embodiments related to the first aspect and said Li-comprising precursor powder are mixed with a molar ratio of Li to (Co+A)>1.00.

Embodiment 9: A sixth aspect of the invention covers a cobalt oxide precursor powder for use in preparing a positive electrode active material, wherein the precursor composition comprises Fd-3m particles having a formula $Co_{1-y}A_yO_x$, wherein 1<x≤4/3, 0≤y≤0.05, and A comprises at least one element from the group consisting of Ni, Mn, Al, Mg, Ti, and Zr, and wherein the particles have a D50≥15 μm, preferably said D50 is ≤25 μm, said cobalt oxide precursor powder having a compressive strength resulting from a process comprising the steps of:

heating a composition comprising cobalt salt particles at a temperature of about 300° C. to about 450° C. in a dry inert atmosphere, preferably in a dry nitrogen or nitrogen-based atmosphere, for about 2-5 hours to form an intermediate cobalt precursor particles, and heating the intermediate precursor particles at a temperature of about 300° C. to about 600° C. in a dry oxidizing atmosphere for about 2-5 hours to form the cobalt oxide precursor powder.

Embodiment 10: In a seventh aspect, the present invention covers a lithium cobalt oxide based active material powder for a secondary battery, said lithium cobalt oxide based active material powder having a ID10"≥−35.00%, preferably ≥−32.00%.

In the framework of the present invention, heating (or heat treating) under a dry (air, oxidizing, nitrogen or $N_2$) atmosphere at a temperature of 300° C. to 600° C. is referred as roasting. The reaction between the cobalt precursor and a lithium source during a calcination treatment (or heating under an oxygen comprising atmosphere) at a temperature from 900° C. to 1200° C. is referred as sintering.

DETAILED DESCRIPTION

In the drawings and the following detailed description, embodiments are described in detail to enable practice of the invention. Although the invention is described with reference to these specific embodiments, it will be understood that the invention is not limited to these embodiments. But to the contrary, the invention includes numerous alternatives, modifications and equivalents as will become apparent from consideration of the following detailed description and accompanying drawings.

The Fd-3m cobalt precursor powder described herein is characterized by the formula $Co_{1-y}A_yO_x$ with 1<x≤4/3 and 0≤y≤0.5. A comprises either one or more metals of the group consisting of Ni, Mn, Al, Mg, Ti, and Zr. The cobalt precursor has an average particle size of at least 15 μm (and preferably inferior or equal to 20 μm) and a compressive strength of at least 100 MPa and at most 170 MPa.

The use of the cobalt precursor powder according to the invention as a precursor of LCO compounds has multiple benefits and advantages. The cycle life and energy density of LCO compounds prepared using the cobalt precursor according to the invention is superior. Additionally, the cost of LCO production is reduced due to the high cobalt content of the precursor according to the invention, since precursor oxide allows higher Co loading for a given volume/mass of precursor with regard to the hydroxide or carbonate-based precursor.

Physical properties of the cobalt precursor powder enable an improved cycle life of an LCO compound prepared using said cobalt precursor powder. This achievement is met because the LCO compound prepared from the precursor powder according to the invention retains the D50≥15 μm and the compressive strength of at least 100 MPa and at most 170 MPa of said precursor. For example, the cobalt precursor powder has an advantageously high compressive strength (i.e. of at least 100 MPa). In the mass production process of LCO compounds, cobalt precursors as well as LCO compounds suffer mechanical stresses continuously. For example, a first step in the production process is to mix a cobalt precursor with a lithium source (e.g., $Li_2CO_3$) and optionally dopants in an industrial mixer with high mixing energy. If the compressive strength of the cobalt precursor is not sufficient, particles of the cobalt precursor are cracked or completely broken during the mixing step. The cracked cobalt precursor can result in an LCO compound comprising cracked LCO particles. Often, the cracked LCO particles are completely broken during a powder transportation process, the electrode process, or during cycling in a battery due to volume changes. The broken part of the LCO particle in a battery does not participate in the electrochemical reaction, thereby resulting in the capacity fading during battery use. Accordingly, mechanical strength of the cobalt precursor powder is very important for battery performance. This is why a compressive strength of a cobalt precursor powder should be of at least 100 MPa.

However, a cobalt precursor powder having a compressive strength of higher than 170 MPa is not desirable. The cobalt precursor particle is generally dense without an internal pore. The reaction of the cobalt precursor and a lithium source during a sintering process (at a lithiation step of said precursor) is relatively slow because lithium ions should migrate through the well-crystalline bulk of the cobalt precursor. Therefore, higher sintering temperature or longer sintering time is recommended when the cobalt precursor having a compressive strength of higher than 170 MPa, rendering the manufacturing process of the cathode material resulting from the lithiation of a cobalt precursor having a compressive strength of higher than 170 MPa expensive and not viable. Additionally, LCO compounds prepared from the described precursor powder, which have a D50≥15 μm and a compressive strength of at least 100 MPa and at most 170 MPa, have a superior volumetric density with respect to LCO compounds not having such size and strength features, thus leading to improved energy densities.

Cobalt salt precursors, such as cobalt carbonate precursors (e.g., $CoCO_3$) or cobalt hydroxide precursors (e.g., $Co(OH)_2$), can have high mechanical strength. However, they have drawbacks as a cobalt precursor of LCO compounds. First, the production throughput can be relatively low when $CoCO_3$ or $Co(OH)_2$ is used as a cobalt precursor in comparison to a cobalt oxide. The cobalt content of $CoCO_3$ and $Co(OH)_2$ is 49.6% and 63.4%, respectively, while the cobalt content of CoO and $Co_3O_4$ is 78.6% and 73.4%, respectively. Given the comparative cobalt content, at equal precursor volume, the cobalt oxide precursor produces more LCO compounds than cobalt carbonate or cobalt hydroxide precursors. Additionally, the electrochemical properties of LCO compounds prepared by $CoCO_3$ and $Co(OH)_2$ precursors (as opposed to cobalt oxide precursors) is inferior. When $CoCO_3$ and $Co(OH)_2$ are reacted with a Li source in the lithiation process, $CO_2$ and $H_2O$ are generated as by-products. As these by-products move out of the mixture, Li can also be rearranged, thereby resulting in inhomogeneous distribution of Li in the final LCO compounds. An inhomogeneous distribution of Li can lead to LCO particles having relatively less Li content. LCO particles with less Li have relatively low mechanical strength and poor electrochemical properties. Accordingly, cobalt oxides such as CoO or $Co_3O_4$ are preferred as cobalt precursors for LCO compounds.

Moreover, a doping or coating on the surface of positive electrode materials can provide high capacity and improved stability. For example, doped $LiCo_{1-y}A_yO_2$ oxides (A=Mn, Al, Ti, Mg, Cr, Ni, Fe, Cu, Fe, B, etc.) show interesting structural and electrochemical properties. For instance, Mn doped $LiCoO_2$ ($LiCo_{0.8}Mn_{0.2}O_2$) showed a remarkable improvement in the kinetic reversibility and the cycle stability, as exhibited in J Solid State Electrochem (2000) 4: 205. Doped or coated cobalt oxide precursors can lead to positive electrode materials having doped or coated surfaces.

Furthermore, cobalt oxides such as CoO or $Co_3O_4$ with an average particle size of at least 15 μm are preferred as cobalt precursors. The particle size of the cobalt precursor affects the production process and the performance of LCO compounds made therefrom. The benefits of the cobalt oxides described above can be enhanced if the average particle size of the cobalt oxide precursor is at least 15 μm. For example, a relatively large particle size enables high throughput of LCO and high volumetric density. Conversely, if the average particle sizes of the cobalt oxide precursors are too small, the throughput of LCO production is too low to produce a product with high volumetric density.

As shown in the examples below, the performance of LCO compounds prepared using cobalt oxide precursors with a particle size of less than 15 μm is worse than the performance of LCO compounds prepared using cobalt oxide precursors with a particle size of at least 15 μm when the LCO compounds are produced using the same process.

In an exemplary embodiment, the cobalt oxide precursors can be prepared as follows:

The precipitation process described in U.S. Pat. No. 9,972,843, which is hereby incorporated by reference herein, can be used to prepare $CoCO_3$ and $Co(OH)_2$ having an average particle size of at least 15 μm. Dopants such as Ni, Mn, Al, Mg, Ti, and Zr can be added during precipitation. $CoCO_3$ and $Co(OH)_2$ are raw materials of the cobalt oxide precursors.

The precipitated raw material (e.g., $CoCO_3$ and $Co(OH)_2$) having the desired size can be roasted under selected conditions to prepare cobalt oxide precursors. Dopants can be added during roasting as well.

The average particle size of the raw material and the conditions during the roasting process affect the physical properties of the cobalt oxide precursors and therefore affect the electrochemical properties of LCO compounds resulting therefrom. With regard to particle size, the average particle size of the raw material particles prepared during precipitation determines the average particle size of the resulting cobalt oxides because the morphology of the particles remains relatively unchanged after roasting. However, some shrinkage of the particle size can be expected after roasting.

With regard to electrochemical performance, the mechanical strength of cobalt oxide precursors is dependent on operating conditions during the roasting process. In particular, as it will be shown in the examples below, when the raw materials are roasted (or heated or sintered in a dry atmosphere) in a non-oxidizing atmosphere followed by an oxidizing atmosphere, the mechanical strength of the resulting cobalt oxides is high. In an exemplary embodiment, when the described sequential atmospheres are used during the roasting process, the cobalt in the raw material (e.g., $Co(OH)_2$) is reduced due to low oxygen partial pressure in the non-oxidizing atmosphere (e.g., $N_2$), thereby producing a cobalt oxide intermediate (e.g., CoO). Then, the cobalt in the cobalt oxide intermediate is oxidized due to high oxygen partial pressure in the oxidizing atmosphere (e.g., $O_2$), thereby producing $Co_3O_4$.

The temperature of the roasting process should be at least 300° C. and at most 800° C. If the temperature is below 300° C., the reduction and oxidation will not take place. If the temperature is higher than 800° C., the cobalt oxides can be sintered too much. For example, the roasting temperature may be about 300-700° C., about 300-600° C., about 300-500° C., or about 350-450° C. In further examples, the roasting temperature may be about 300° C., 325° C., 350° C., 375° C., 400° C., 425° C., 450° C., 475° C., 500° C., 525° C., 550° C., 575° C., or 600° C. The roasting temperature of the non-oxidizing atmosphere may be the same as that of the oxidizing atmosphere. Alternatively, the roasting temperature of the non-oxidizing atmosphere may be different from that of the oxidizing atmosphere.

The roasting time should be long enough to reduce and oxidize at least substantially all of the powder introduced to the furnace. Thus, the roasting time will depend on factors such as the amount of powder and the type of furnace. Generally, the roasting time for a static furnace is at least one hour and at most 15 hours. For example, the roasting time may be about 1-10 hours, about 1-8 hours, about 2-6 hours, or about 2-4 hours. In further examples, the roasting time may be 1 hour, 2 hours, 3 hours, 4 hours, 5 hours, 6 hours, 7 hours, 8 hours, 9 hours, 10 hours, 11 hours, 12 hours, 13 hours, 14 hours, or 15 hours. The roasting time in the non-oxidizing atmosphere may be the same as that in the oxidizing atmosphere. Alternatively, the roasting time in the non-oxidizing atmosphere may be different from that in the oxidizing atmosphere.

Cobalt oxides prepared by a roasting process wherein a cobalt-containing raw material is first roasted in a non-oxidizing atmosphere and then subsequently roasted in an oxidizing atmosphere have a higher mechanical strength than cobalt oxides prepared by a roasting process having a single type of atmosphere. Moreover, the resulting LCO compounds (i.e., those made using cobalt oxide precursors prepared by the described two-atmosphere, sequential roasting process) have superior electrochemical properties. In fact, a cobalt oxide precursor having an average particle size of less than 15 μm, but which is prepared by the described two-atmosphere, sequential roasting process, has higher mechanical strength than a cobalt oxide precursor with a similar size and composition, but which is prepared by a single atmosphere roasting process. Nonetheless, LCO compounds prepared using cobalt oxide precursors having an average particle size less than 15 μm (regardless of manufacturing method) have inferior electrochemical properties and volumetric density despite the higher mechanical strength.

Operationally, roasting using two different, sequential atmospheres can be performed using various furnace configurations. For example, two-atmosphere, sequential roasting can be effected using two disconnected furnaces. With disconnected furnaces, the first roasting can take place in a furnace with a non-oxidizing atmosphere for a specified temperature and time. The second roasting can take place in a subsequent, separate furnace with an oxidizing atmosphere for a specified temperature and time. Alternatively, a single furnace wherein the atmosphere is changed from non-oxidizing atmosphere for the first roasting to an oxidizing atmosphere for the second roasting can also be used.

The following analysis methods are used in the Examples:

A) X-Ray Diffraction Measurement

The X-ray diffraction (XRD) pattern of the positive electrode material was collected with a Rigaku X-Ray Diffractometer (Ultima IV) using a Cu Kα radiation source (40 kV, 40 mA) emitting at a wavelength of 1.5418 Å. The instrument configuration was set at: a 1° Soller slit (SS), a 10 mm divergent height limiting slit (DHLS), a 1° divergence slit (DS), and a 0.3 mm reception slit (RS). The diameter of the goniometer was 158 mm. For the XRD, diffraction patterns were obtained in the range of 15-85° (2θ) with a scan speed of 1° per min and a step-size of 0.02° per scan. Quantitative phase analysis for cobalt oxides like $Co_3O_4$ and CoO in the cobalt precursor was carried out using a TOPAS software.

B) SEM Analysis

A morphology of a positive electrode material was analyzed by a Scanning Electron Microscopy (SEM) technique. The measurement is performed with a JEOL JSM 7100F scanning electron microscope equipment under a high vacuum environment of $9.6 \times 10^{-5}$ Pa at 25° C. Images (at least two for each particle) of a sample were recorded with magnification of 1000 times to demonstrate the circularity of the materials. Based from the SEM images, ten representative particles having the average particle size were selected and the circularity of the particles was then calculated as follows:

$$\text{Circularity} = 4\pi \frac{A}{P^2}$$

where the surface area (A) and the perimeter (P) of the representative precursor particles are obtained by using a well-known Image)-based software (reference is made to the Sections 30.2 to 30.7—"Set measurement" of the Image) user guide, https://imagej.nih.gov/ij/docs/guide/user-guide.pdf or https://imagej.nih.gov/ij/docs/guide/146-30.html).

As mentioned above, the calculation of the circularity implies the measurement of:
i) The perimeter which is determined by: a) determining an outside boundary of the SEM image of a particle, by b) decomposing the outside boundary into individual segment-based selections, each of these selections having an individual perimeter, and by c) adding the values of the lengths of the individual perimeters so as to obtain the value of the perimeter of a particle; and
ii) The area which is calculated by: adding a plurality of pixel areas included in a surface defined by the outside boundary.

A circularity of 1.00 means that the particles representative of a powder sample have a spherical shape.

A circularity inferior to 1.00 means that the particles representative of a powder sample have a non-spherical shape.

A circularity superior to 0 and inferior to 1 refers to an ellipsoidal shape.

C) Particle Strength Measurement

The strength of the precursor particles was investigated by using a measurement for compressive strength. In addition, changes in particle size distribution (PSD) were measured before and after applying a specific pressure, such as 50 MPa.

C1) Particle Pressing Test (PPT)

Particle strength was analyzed by investigating PSD changes after applying a pressure. First, precursor powder was put in a stainless-steel pellet die with a diameter "d" of 1.3 cm. A uni-axial pressure of 50 MPa was applied. The obtained pellet was then gently unraveled with the finger or a mortar to obtain a loose powder for PSD measurement (described below in E).

C2) Compressive Strength Measurement

To evaluate the compressive strength of precursor particles, a micro compression tester (Shimadzu, MCT-W500-E) was used. Ten representative particles having the average particle size were selected. Each of the representative particles was pressed with continuously increasing force until it broke. The minimum value of the applied force for breaking each particle was considered as the compressive strength (MPa) for that particle.

D) Pellet Density Measurement (PDM)

The pressed density (PD) was measured as follows: 3 g of powder was filled in a pellet die with a diameter "d" of 1.3 cm. A uniaxial pressure of 207 MPa, was applied to the pellet for 30 seconds. After relaxing the load, the thickness "t" of the pressed pellet was measured. The pressed density was then calculated as follows:

$$PD = \frac{3}{\pi \left(\frac{d}{2}\right)^2 t} \left(\text{in } \frac{g}{cm^3}\right)$$

After pressing, the powder was further investigated by E) PSD measurement.

E) Particle Size Distribution Measurement

The particle size distribution (PSD) of the powder before and after the Particle pressing test or PD measurement was analyzed using a Malvern Mastersizer 3000 equipped with Hydro MV wet dispersion accessory after dispersing the powder in an aqueous medium. In order to improve the dispersion of the powder in the aqueous medium, sufficient ultrasonic irradiation and stirring were applied and a suitable surfactant was introduced. As used herein, D10, D50, and D90 are defined as the particle size at 10%, 50%, and 90% of the cumulative volume % distribution.

D10 was measured before and after the Particle pressing test. The change in D10 from before pressing to after pressing under 50 MPa was calculated as follows:

$$D10 \text{ increase } (ID10') = \frac{D10 \text{ after } PPT - D10 \text{ before } PPT}{D10 \text{ before } PPT} \times 100 \text{ (in \%)}$$

D10 was measured before and after PD measurement. The change in D10 from before pressing to after pressing under 207 MPa was calculated as follows:

$$D10 \text{ increase } (ID10'') = \frac{D10 \text{ after } PDM - D10 \text{ before } PDM}{D10 \text{ before } PDM} \times 100 \text{ (in \%)}$$

The change in D10 can be used as a criterion to quantify the damage to the powder and thus, the strength of the powder, after being pressed under a pressure of 50 MPa or 207 MPa.

F) Inductively Coupled Plasma Analysis

The composition of powder samples was determined using the inductively coupled plasma (ICP) method using an Agillent ICP 720-ES. A 2 g powder sample was dissolved into 10 mL high purity hydrochloric acid in an Erlenmeyer flask. The flask was covered by glass and heated on a hot plate for complete dissolution of the precursor. After being cooled to the room temperature, the solution was moved to a 100 mL volumetric flask with 3-4 times of rinsing the flask using distilled (DI) water. Afterwards, the volumetric flask was filled with DI water up to the 100 mL mark, followed by complete homogenization. 5 mL solution was taken out by a 5 mL Pipette and transferred into a 50 mL volumetric flask for the $2^{nd}$ dilution, where the volumetric flask was filled with 10% hydrochloric acid up to the 50 mL mark and then homogenized. Finally, the 50 mL solution was used for ICP measurement.

The x and y in the formula $Co_{1-y}A_yO_x$ of a cobalt oxide precursor is obtained by the weight ratio of elemental Co and elemental A with respect to the total weight of the powder sample in the ICP analysis. For example, a cobalt oxide precursor having a Co of 71.32% and Mn of 2.06% with respect to the total weight of the cobalt oxide precursor has a general formula of $Co_{0.97}Mn_{0.03}O_{4/3}$ (x=4/3 and y=0.03).

G) Coin Cell Testing

G1) Coin Cell Preparation

For the preparation of a positive electrode, a slurry that contains electrochemical active material, conductor (Super P, Timcal), and binder (KF #9305, Kureha)—with a formulation of 90:5:5 by weight—in a solvent (NMP, Mitsubishi) was prepared by a high speed homogenizer. The homogenized slurry was spread on one side of an aluminum foil using a doctor blade coater with a 230 μm gap. The slurry-coated foil was dried in an oven at 120° C. and then pressed using a calendaring tool. Then it was dried again in a vacuum oven to completely remove the remaining solvent in the electrode film. A coin cell was assembled in an argon-filled glovebox. A separator (Celgard 2320) was located between the positive electrode and a piece of lithium foil used as a negative electrode. 1M $LiPF_6$ in EC/DMC (1:2) was used as electrolyte and was dropped between separator and electrodes. Then, the coin cell was completely sealed to prevent leakage of the electrolyte.

G2) Testing Method 1

The coin cell test of the present invention, which was a conventional "constant cut-off voltage" test, followed the schedule shown in Table 1.

Each cell was cycled at 25° C. using a Toscat-3100 computer-controlled galvanostatic cycling station (from Toyo). The coin cell testing procedure used a 1C current definition of 185 mA/g in the 4.50-2.75V/Li metal window range.

CQ1 (mAh/g) and DQ1 (mAh/g) were the charge and discharge capacities of the first cycle, respectively.

TABLE 1

Cycling schedule for coin cell testing method 1

| | Charge | | | | Discharge | | | |
|---|---|---|---|---|---|---|---|---|
| Cycle No | C Rate | End current | Rest (min) | V/Li metal | C Rate | End current | Rest (min) | V/Li metal (V) |
| 1 | 0.20 | 0.05C | 3 | 4.50 | 0.20 | — | 10 | 2.75 |

G3) Testing Method 2

The coin cell testing procedure used a 1C current definition of 225 mA/g. This testing method was the evaluation of cycle life at 0.2 C in the 4.60-2.75V/Li metal window range. Table 2 shows the coin cell testing schedule.

Remaining capacity (QR in %) is calculated as follows:

$$QR = \frac{DQ50}{DQ1} \times 100 \; (\%)$$

DQ1 (mAh/g) is the discharge capacity of the $1^{st}$ cycle.
DQ50 (mAh/g) is the discharge capacity of the $50^{th}$ cycle.

TABLE 2

Cycling schedule for coin cell testing method 2

| | Charge | | | | Discharge | | |
|---|---|---|---|---|---|---|---|
| Cycle No | C Rate | End current | Rest (min) | V/Li metal (V) | C Rate | End current | Rest (min) | V/Li metal (V) |
| 1–50 | 0.20 | 0.05C | 3 | 4.60 | 0.20 | — | 10 | 2.75 |

The invention is further exemplified in the following examples:

Example 1 and Comparative Examples 1

$Co_{0.97}Mn_{0.03}(OH)_2$ was prepared by a co-precipitation process in a large scale continuous stirred tank reactor (CSTR) with mixed cobalt-manganese sulfates, sodium hydroxide, and ammonia. The precipitation process was stopped when the particle size of precipitated slurry reached 23 μm. The resulting cobalt hydroxide raw material was referred to as CEX1.1.

A portion of the cobalt raw material CEX1.1 was then roasted at 400° C. under a $N_2$ atmosphere for 3 hours in a furnace to produce CEX1.2. A different portion of the cobalt raw material CEX1.1 was roasted at 400° C. under dry air atmosphere for 3 hours in a furnace to produce CEX1.3. Additionally, the CEX1.2 was again roasted at 400° C. for 3 hours under dry air to produce EX1. CEX1.2 and CEX1.3 have both a compressive strength inferior to 100 MPa (like the precursor in US'633). Lastly, a portion of the cobalt raw material CEX1.1 was roasted at 600° C. under dry air atmosphere for 3 hours in a furnace to produce CEX1.4. CEX1.4 corresponds to the cobalt precursors disclosed in US'807 and US'087 which are obtained by heating $Co(OH)_2$ at respectively 700° C. and 600° C. (i.e. at a T° C.>450° C.) in air. CEX1.4 is also equivalent to the cobalt precursors disclosed in WO'220 which are obtained from a 800° C. to 900° C. heat treatment (i.e. at a T° C.>450° C.) in air. Table 3 below provides a summary of the roasting conditions for the precursors.

To produce an exemplary LCO product, EX1 and $Li_2CO_3$ were mixed with a molar ratio of Li to M' (M'=Co and Mn) (Li/M') of 1.02. The mixture was sintered at 1085° C. for 15 hours under dry air in a furnace. The sintering temperature was much higher than what it would have been for heat treating an undoped $Co_3O_4$ according to the invention (around 940° C.), because the Mn in the EX1 acts as a strong sintering inhibitor. The undoped precursor in EX1-P of WO'165 (i.e. according to CEX3) is treated at a higher temperature of sintering—980° C.—meaning an at least 40° C. difference, which is an important gap from the perspective of upscaled processing of the sintering of $Co_3O_4$ precursors into a cathode material powder.

The sintered, agglomerated LCO compound was ground. As a result, $Li_{1.02}Co_{0.97}Mn_{0.03}O_2$ was formed, which is referred to as LCO1. LCO compounds of LCO2.1, LCO2.2, and LCO2.3 were prepared by the same procedure as LCO1 except that CEX1.1, CEX1.2, and CEX1.3, respectively, were used as the cobalt precursors instead of EX1. The analysis results of EX1, CEX1.1, CEX1.2, CEX1.3, and CEX1.4 are shown in Table 4. The analysis results of LCO1, LCO2.1, LCO2.2, and LCO2.3 are shown in Table 5.

Comparative Example 2

CEX2 was prepared using the same method used for EX1, except that the precipitation was stopped when the particle size of precipitated slurry reached 7 μm. LCO3 was prepared using the same procedure as LCO1 except that CEX2 was used as a cobalt precursor instead of EX1.

The analytical results for CEX2 and LCO3 are also shown in Table 4 and Table 5, respectively.

Comparative Example 3

CEX3 is a cobalt oxide ($Co_3O_4$) disclosed in WO'165.

Example 2

EX2 was prepared using the same method used for EX1, except that $CoCO_3$ was used as a cobalt raw material. $CoCO_3$ has a D50 of 26.0 μm.

LCO4 is prepared using the same procedure as LCO1 except that EX2 was used as a cobalt precursor instead of EX1. Additionally, the sintering temperature to convert EX2 into LCO4 is 940° C.

The analytical results for EX2 and LCO4 are also shown in Table 4 and Table 5, respectively.

TABLE 3

Summary of roasting conditions.

| Example ID | T (° C.) | $N_2$ atmosphere | Air atmosphere | Total roasting time | D50 (μm) |
|---|---|---|---|---|---|
| CEX1.1 | 400 | n/a | n/a | n/a | 23.1 |
| CEX1.2 | 400 | X | | 3 hours | 17.1 |
| CEX1.3 | 400 | | X | 3 hours | 17.9 |
| CEX1.4 | 600 | | X | 3 hours | 18.9 |
| EX1 | 400 | X | X | 6 hours | 18.3 |
| CEX2 | 400 | X | X | 6 hours | 7.6 |
| EX2 | 400 | X | X | 6 hours | 21.0 |

TABLE 4

Physical properties of EX1; CEX1.1; CEX1.2; CEX1.3; and CEX2

| Example ID | Space group | Circularity | D50 (μm) | ID10' (%) | Compressive strength (MPa) |
|---|---|---|---|---|---|
| EX1 | Fd-3m | 0.89 | 18.3 | −27.6 | 136.9 |
| CEX1.1 | P-3m1 | 0.92 | 23.1 | −5.1 | 185.7 |
| CEX1.2 (US'633) | Fm-3m | 0.90 | 17.1 | −83.1 | 64.4 |
| CEX1.3 (US'633) | Fd-3m | 0.90 | 17.9 | −64.4 | 83.1 |

TABLE 4-continued

Physical properties of EX1; CEX1.1; CEX1.2; CEX1.3; and CEX2

| Example ID | Space group | Circularity | D50 (μm) | ID10' (%) | Compressive strength (MPa) |
|---|---|---|---|---|---|
| CEX1.4 (US'807, US'087, WO'220) | Fd-3m | 0.89 | 18.9 | −91.4 | 58.0 |
| CEX2 | Fd-3m | 0.88 | 7.6 | −10.3 | 173.1 |
| CEX3 (WO'165) | Fd-3m | 0.95 | 18.1 | −3.7 | 189.4 |
| EX2 | Fd-3m | 0.94 | 21.0 | −13.5 | 165.7 |

As shown in Table 4, non-roasted $Co_{0.97}Mn_{0.03}(OH)_2$ (CEX1.1) had the highest compressive strength. When the cobalt source was roasted at 400° C. or 600° C. in $N_2$ or dry air, the resulting powders had lower particle strength.

The two cobalt oxide powder samples obtained through consecutive roasting treatment of roasting in a $N_2$ atmosphere, followed by roasting in a dry air atmosphere (EX1, CEX2, and EX2), had higher particle strengths than the other tested samples that were roasted. EX1 particles were larger than CEX2 particles, namely, EX1 had a D50 of 18.3 μm and CEX2 had a D50 of 7.9 μm.

TABLE 5

Physical and electrochemical properties of LCO1; LCO2.1; LCO2.2; LCO2.3; and LCO3

| Product ID | Example ID | PD (g/cm³) | D50 (μm) | ID10'' (%) | Coin cell- Testing method 1 DQ1 (mAh/g) | Coin cell- Testing method 2 QR (%) |
|---|---|---|---|---|---|---|
| LCO1 | EX1 | 3.87 | 18.3 | −28.0 | 192.4 | 52.6 |
| LCO2.1 | CEX1.1 | 3.87 | 19.4 | −39.3 | 190.4 | 33.7 |
| LCO2.2 | CEX1.2 | 3.79 | 21.2 | −45.1 | 189.9 | 35.4 |
| LCO2.3 | CEX1.3 | 3.84 | 19.8 | −46.4 | 190.2 | 34.8 |
| LCO3 | CEX2 | 3.48 | 7.6 | −48.6 | 189.1 | 29.1 |
| LCO4 | EX2 | 3.84 | 21.3 | −41.9 | 192.7 | 32.5 |

Figure 1:
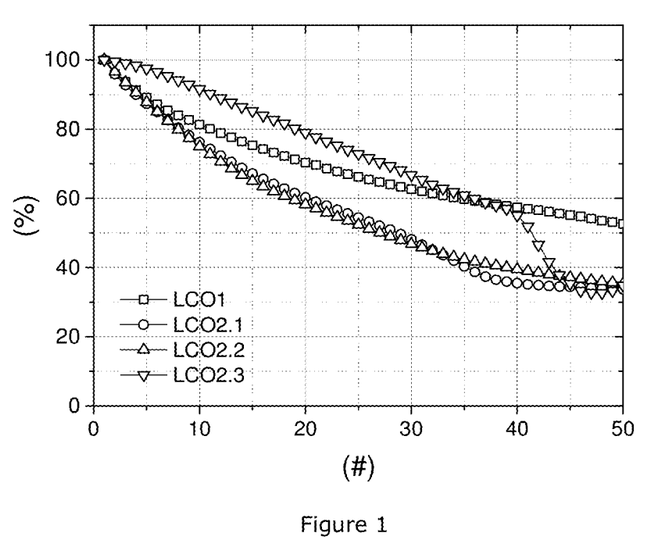
FIG. 1 is a chart showing the remaining capacities of LCO1, and LCO2.1 to LCO2.3 as a function of cycle number, wherein the x-axis is the number of cycles and the y-axis is the remaining capacity.

LCO1, which was manufactured from EX1, had the best performance. In particular, LCO1 showed the high initial discharge capacity and the highest remaining capacity after the fiftieth cycle (QR) as shown in Table 5. FIG. 1 also illustrates the superior performance of LCO1. FIG. 1 is a chart showing the remaining capacities of LCO1, and LCO2.1 to LCO2.3 as a function of cycle number, wherein the x-axis is the number of cycles and the y-axis is the remaining capacity. FIG. 1 illustrates that LCO1 has high remaining capacity after many cycles. In particular, LCO1 has the highest remaining capacity after 40 cycles.

Figure 2A:
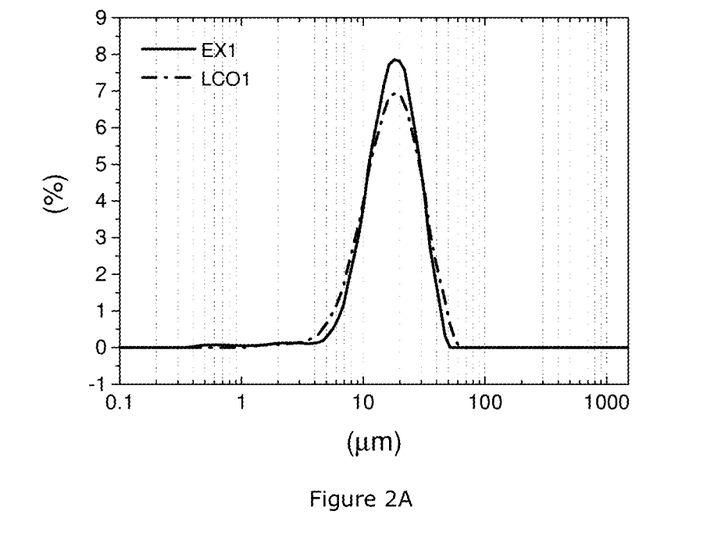
FIG. 2A is a chart showing PSD curves of EX1 and LCO1, wherein the x-axis is the particle size and the y-axis is the volume.

The high particle strength of EX1 contributed to the excellent battery performance for LCO1. FIG. 2A provides a comparison of the PSD curves for EX1 and LCO1. As can be seen, there is very little difference in PSD curves between EX1 and LCO1, indicating that the high compressive strength of EX1 enabled very little particle damage to occur during the process of preparing LCO1. Additionally, as shown in Table 4, EX1 had a circularity of 0.89 (which is very similar to the circularity of the cobalt raw materials that were roasted to produce EX1), indicating the maintenance of spherical particles even after the roasting process of the cobalt raw material.

Composition of the precursor particle can also affect electrochemical properties of the resulting LCO material. The following example illustrates this point.

Figure 2B:
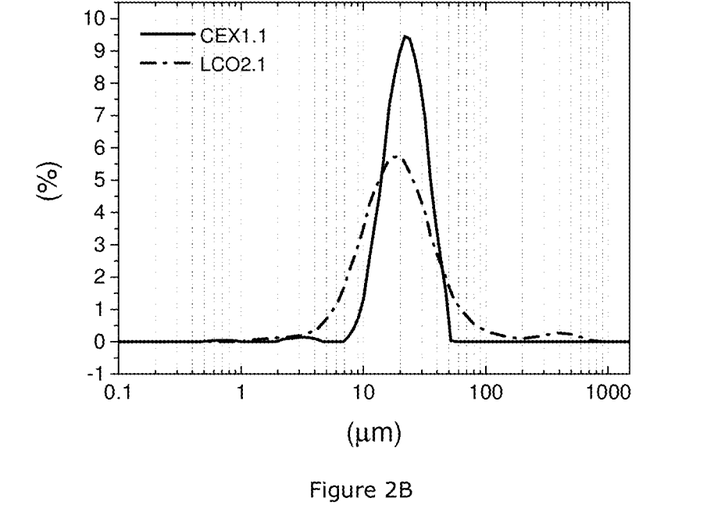
FIG. 2B is a chart showing PSD curves of CEX1.1 and LCO2.1, wherein the x-axis is the particle size and the y-axis is the volume.

FIG. 2B provides a comparison of the PSD curves for CEX1.1 and LCO2.1. As shown in FIG. 2B, despite the fact that CEX1.1 had a relatively high compressive strength, there was a relatively large difference in the particle size distributions for CEX1.1 and LCO2.1. Additionally, LCO2.1 had relatively poor electrochemical properties.

Figure 3:
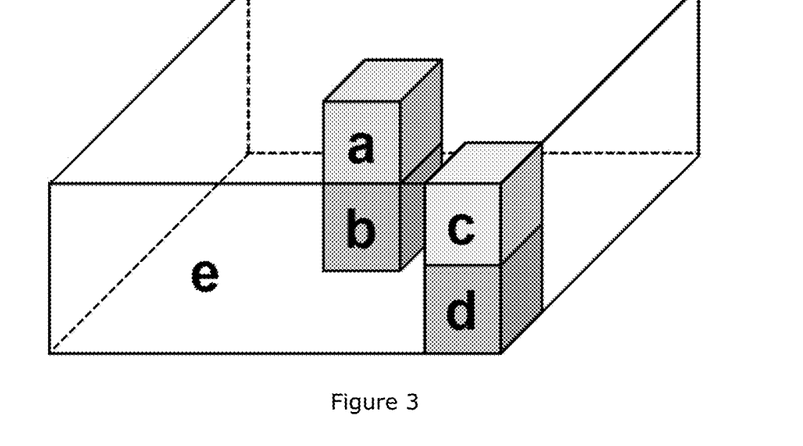
FIG. 3 is a schematic figure illustrating various locations from which exemplary LCO product particles were selected in a tray after lithiation for ICP analysis.

FIG. 3 shows a schematic model of a tray used during the lithiation process to manufacture LCO1 and LCO2.1. After the lithiation process, exemplary samples of the LCO1 and LCO2.1 powders were taken from the 'a' portion to 'e' portion of the tray and their Li/M' ratios were analyzed by ICP analysis.

Figure 4:
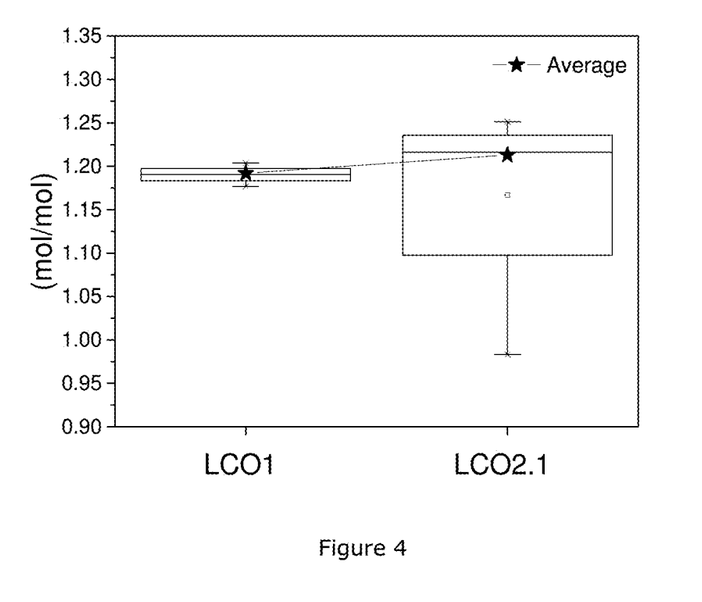
FIG. 4 is a chart showing Li/M' ratios of LCO products selected in the tray shown in FIG. 3.

The ICP analysis results for the samples are shown in FIG. 4. As can be seen, the Li/M' ratios for the LCO2.1 samples varied (i.e., were not constant) throughout the tray. The sampled particles indicated that the Li/M' ratio varied by about 15% based on the average Li/M' ratio throughout the tray. It is desirable to keep the percentage change of the Li/M' ratio throughout the powder to less than about 5%, preferably to less than about 3%. As described above, the inhomogeneous Li distribution was caused by the production of $H_2O$ as a by-product during the lithiation reaction because the precursor was a cobalt hydroxide (as opposed to a cobalt oxide). An inhomogeneous distribution of Li can lead to some LCO particles having relatively less Li content. The LCO particles with less Li have relatively low mechanical strength and poor electrochemical properties thus leading to inferior electrochemical performance of the LCO powder as a whole. In contrast, the Li/M' ratios for the LCO1 samples were relatively constant and relatively uniform throughout the tray. The sampled LCO1 particles indicated that the Li/M' ratio varied by less than 2% throughout the tray. Relatively homogenous Li distribution in the LCO1 powder promotes good electrochemical performance. Thus, the composition of the cobalt precursor (hydroxide versus oxide) adversely affected the performance of the resulting electrode material.

As can be seen in Table 5, LCO3, which was prepared by the cobalt oxide having D50 of 7.9 μm had inferior electrochemical properties and low volumetric density.

LCO4, which was prepared using an undoped $Co_3O_4$ (EX2) at 940° C., shows the higher initial discharge capacity than that of LCO1 from EX1.

All the above-described LCO1, 2.1-2.3, 3, and 4 comprise particles having a R-3m crystal structure.

The invention claimed is:

1. A cobalt oxide precursor powder for use in preparing a positive electrode active material, wherein the precursor composition comprises particles having a formula $Co_{1-y}A_yO_x$, wherein $1<x\leq 4/3$, $0\leq y\leq 0.05$, A comprising at least one element selected from the group consisting of Ni, Mn, Al, Mg, Ti, and Zr, wherein the particles composition has a Fd-3m crystal structure and wherein the particles have a D50≥15 μm and a compressive strength of at least 100 MPa and at most 170 MPa.

2. The cobalt oxide precursor powder according to claim 1, wherein A comprises Mn.

3. The cobalt oxide precursor powder according to claim 1, wherein the particles have a circularity superior or equal to 0.80 and inferior or equal to 1.00.

4. The cobalt oxide precursor powder according to claim 1, wherein the molar ratio Li/(Co+A) for particles in the powder varies by less than 5%.

5. The cobalt oxide precursor powder according to claim 1, wherein the molar ratio Li/(Co+A) for particles in the powder varies by less than 3%.

* * * * *